US010076717B2

(12) United States Patent
Turchetti

(10) Patent No.: US 10,076,717 B2
(45) Date of Patent: Sep. 18, 2018

(54) METALLIC FILTRATION BODY

(71) Applicant: Attilio Turchetti, Abadia de Goiás-Go (BR)

(72) Inventor: Attilio Turchetti, Abadia de Goiás-Go (BR)

(*) Notice: Subject to any disclaimer, the term of this patent is extended or adjusted under 35 U.S.C. 154(b) by 952 days.

(21) Appl. No.: 14/515,987

(22) Filed: Oct. 16, 2014

(65) Prior Publication Data

US 2015/0108059 A1  Apr. 23, 2015

(30) Foreign Application Priority Data

Oct. 17, 2013  (BR) .......................... 102013026762 7

(51) Int. Cl.
| | |
|---|---|
| *B01D 29/64* | (2006.01) |
| *B01D 35/22* | (2006.01) |
| *B01D 29/68* | (2006.01) |
| *B01D 29/11* | (2006.01) |
| *B01D 39/12* | (2006.01) |

(52) U.S. Cl.
CPC ............ *B01D 35/22* (2013.01); *B01D 29/118* (2013.01); *B01D 29/6476* (2013.01); *B01D 29/682* (2013.01); *B01D 39/12* (2013.01)

(58) Field of Classification Search
CPC .... B01D 35/22; B01D 29/682; B01D 29/118; B01D 29/6476; B01D 39/12; B01D 39/10; B01D 29/54
See application file for complete search history.

(56) References Cited

U.S. PATENT DOCUMENTS 4,309,284 A * 1/1982 Morimoto .............. D21D 5/026
209/273
4,383,918 A * 5/1983 Chupka .................... B07B 1/20
209/234

(Continued)

FOREIGN PATENT DOCUMENTS

BR  PI 9201898-0  10/1993
BR  PI 0700933-0   5/2007

(Continued)

*Primary Examiner* — Thomas M Lithgow
(74) *Attorney, Agent, or Firm* — Leason Ellis LLP

(57) ABSTRACT

This descriptive report refers to an invention patent for the improvement in a metallic filtration body, belonging to the area of filtration equipment components for liquids, particularly the equipment named turbo filter (100), formed by: a filter body provided with intermediate filtration chamber (101), with extreme product inlet (102), lower filtrate outlet (103) and an opposite outlet for solids (104); by the metallic filtration body (1); by a rotor (105), provided with a set of fine step paddles (106), laid out at the turbo filter body inlet; and a set of coarse step paddles (107), laid inside and along the filtration body (1); by washing and counterwashing devices in the filtration body; by a motor device (108) for driving the rotor and others; said metallic filtration body (1) comprising basically two or more sections of the coaxial tubular metallic filtration body (1)'; by a connection device (20) among the sections of the tubular metallic (1)' filtration body; and by a regulation device (60) for the product, within the sections of the tubular metallic filtration body (1)'.

10 Claims, 6 Drawing Sheets

(56) References Cited

U.S. PATENT DOCUMENTS

| | | | | |
|---|---|---|---|---|
| 5,059,324 A | * | 10/1991 | Chen | B01D 29/356 209/273 |
| 5,858,228 A | * | 1/1999 | Turchetti | B01D 29/118 210/249 |
| 6,119,867 A | * | 9/2000 | Ljokkoi | B01D 29/445 209/273 |
| 6,698,595 B2 | * | 3/2004 | Norell | B01D 29/012 210/162 |

FOREIGN PATENT DOCUMENTS

| | | | |
|---|---|---|---|
| BR | PI0700933 | * | 4/2008 |
| BR | PI 1005744-7 | | 11/2011 |
| BR | CI 0700933-0 | | 12/2011 |

\* cited by examiner

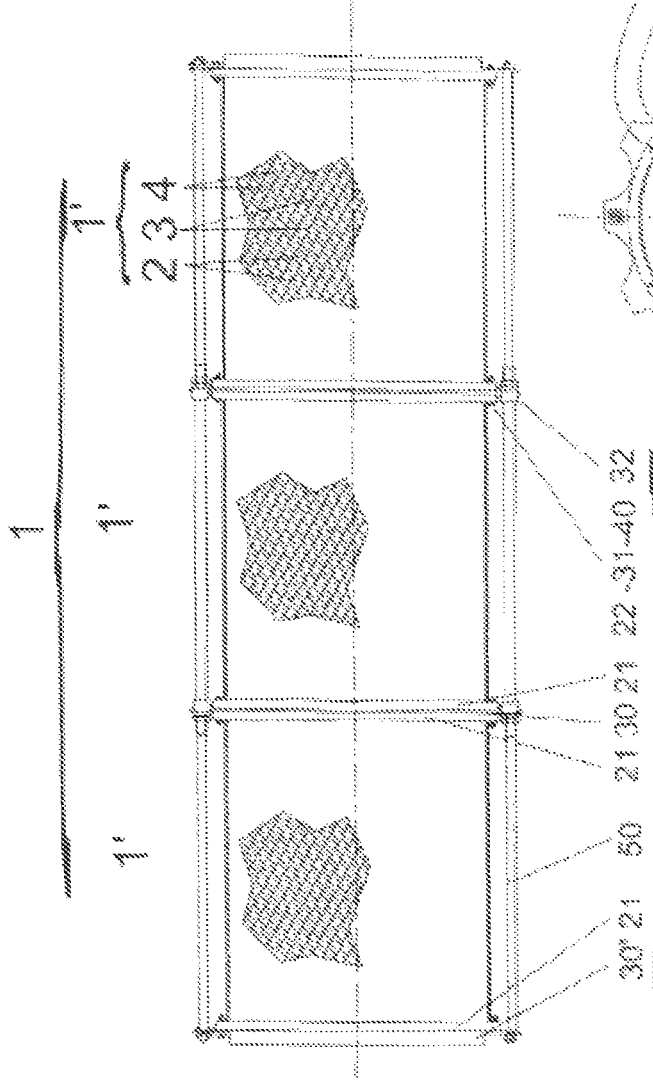

METALLIC FILTRATION BODY

CROSS-REFERENCE TO RELATED APPLICATION

The present application claims priority under 35 U.S.C. 119 to Brazilian Patent Application No. 026762-7, filed Oct. 17, 2013, which is hereby incorporated by reference in its entirety.

TECHNICAL FIELD

This descriptive report refers to a patent of invention for the improvement of a metallic filtrating body, belonging to the area of liquid filtrating equipment components, particularly the equipment named turbo filter, object of numberless patent applications and patents by the same applicant, as the patent application PI 0700933-0 and the Certificate of Invention Amendment CI 0700933-0.

BACKGROUND

The turbo filter is intended to filter liquid products containing insoluble solid particles, and in its traditional construction, prior to that of patent applications referred to above, such as the one, for example, of PI 9201898-0, of Apr. 24, 1992, it essentially comprises a filter body provided with an intermediate filtrating chamber with extreme feeding inlet, lower filtrate outlet and opposite extreme solid outlet; a filtrating element in the form of cylindrical filtrating sleeve, made in technical cloth laid out inside and along the filtrating chamber and connected to its inlet and outlet by a rotor placed inside and along the filtrating sleeve and provided with two sets of helical paddles, a set of fine step paddles that provides axial impulse and no radial impulse for the product, which defines an inlet state for the product to be filtrated, and a set of coarse step paddles provided with convex dragging surface, which gives a great radial impulse and a small axial one, which defines the processing stage in which the product outflows in the form of growing vortex between the inlet and outlet and close to the internal face of the filtrating sleeve, providing simultaneously the filtration and the self-cleaning effect by sleeve washing, the main functional features of the turbo filter and which made it known to users; an elastic support for the filtrating sleeve, which allows it to extend radially and shrink axially in the pressure peaks, so as not to deform or break, and return to the normal share upon the end of overpressure; a filtrating sleeve washing device; a motor set to drive the rotor and others.

With the continuity of studies on the filtration of liquid products with insoluble suspended solids, the turbo filter inventor conceived an innovating filtration system, according to which the retaining capacity, as to the lower size of the solid particle to be retained, is determined mainly by the angular position among the filtrating element vents and the directions of flows of the product to be filtrated, which cross the vents; said angular position is selected for the orthogonal projection of a vent in a plane perpendicular to the corresponding flow of product to be filtered, which crosses said vent, be smaller than the least particle of the insoluble solid to be retained. Such a process is performed by a turbo filter provided with specific improvements, as per the patent application PI 0700933-0, referred to above.

By continuing the studies, the inventor conceived an improved metallic filtrating body object of CI 0700933-0, to be used in the turbo filter that performs the new filtration process informed by PI 0700933-0. Such a metallic filtrating body is substantially a tubular metallic grid formed by a number of thicker reinforcement bars parallel to each other, and a number of thinner parallel stems, placed perpendicularly to the bars and welded to the same, with the spaces defined by said bars and stems constituting the filtrating vents in the filtrating body constituted by the grid.

Such a filtrating body construction works properly, but studies performed show it is liable to be improved, mainly when the turbo filter performs filtrating processes of liquid products with high contents of abrasive suspended solids, such as informed in the patent application PI 1005744-7 by the same inventor.

In fact, said studies show that in given types of filtration, for example when the product presents high contents of abrasives, as in case of sugar came syrups, the whole turbo filter set can be very demanded, mainly the filtrating element, which must be efficient to retain the solid phase and let the liquid phase of product pass, and therefore, even though it is metallic, it is severely attacked by the eventual abrasiveness of the product.

OBJECTIVES OF THE INVENTION

Thus, the main objective of the invention is to provide with a metallic filtrating body that meets the needs of new filtration concepts incorporated to the turbo filter and is better adapted for filtrations of liquid products with several insoluble suspended solids, particularly products with high contents of abrasives.

Another objective is to provide with a metallic filtrating body that incorporates resources to improve the control on the filtration process.

Another objective is to provide with a metallic filtrating body that presents construction, manufacture and costs proper for the filtration processes the turbo filter is intended to.

SUMMARY

In view of the aspects and objectives referred to above, and so as to meet and attend them, an improvement to the metallic filtrating body object of this patent was developed, which is made up essentially by a tubular metallic grid made up by: a number of thicker reinforcement bars laid out parallel to each other, and a number of thinner stems laid out perpendicularly to the bars and welded to them, with the spaces defined by said bars and stems constituting the filtrating vents; said metallic filtration body in this improvement is formed by two or more, preferably three, sections of the metallic filtration body, each section being formed by a tubular grid made up by the plurality of reinforcement bars and crossed stems welded to one another and the filtration vents defined by the bars and stems, said improvement also comprising a connection device for the sections of the metallic filtration body; a flow regulating device for the product inside and among the sections of the metallic filtrating body.

Said filtrating body construction enables it to be fully adaptable to the needs of a new filtration process performed by the turbo filter, according to which it is the relative position among the filtration body vents and the flow of product that determines the size of the particle to be retained, being at the same time better fit to the filtration process of liquid products with, insoluble suspended solids with high abrasiveness, as noticed in the sugar cane syrup and others, as per the main objectives of the invention.

In fact, the filtrating body composition with at least three sections of the filtrating body, in axial assembly, divides the efforts acting on the filtration body as a whole, thus enabling it to be less susceptible to damages. In the other hand, in case of an eventual damage to one of the filtration body sections, the repair is simplified, since it is made by simply change the damaged section for another new one. This form of repair also leads to a lower cost, since there is no need of changing the whole filtration body, and the turbo filter downtime is shorter.

Since the tubular metallic grid metallic filtration body under this invention is made up by isolated sections assembled axially to one another, the connection device of said filtration body sections can comprise coupling flanges between the ends of said filtration body sections, said flanges eventually having bossed surfaces projected inside adjacent filtration body sections, which can have proper profiles to ac on the flow of circulating product inside and among the filtration body sections, for example, profiles to act as a flow brake. This provides with more control on the filtration process.

Furthermore, as the filtration body is made with several sections, each section can have filtration vents with different sizes, thus leading to a higher control on the filtration process.

BRIEF DESCRIPTION OF THE DRAWING FIGURES

The annexed drawings refer to the improvement to a metallic filtration body object of this patent, in which:

FIGS. 2 and 3 show the metallic filtration body object of the invention, in front and extreme views, respectively;

FIGS. 5 and 5A-5C shows the metallic filtration body in front view and with enlarged details A, B, C;

DETAILED DESCRIPTION OF CERTAIN EMBODIMENTS

Figure 1:
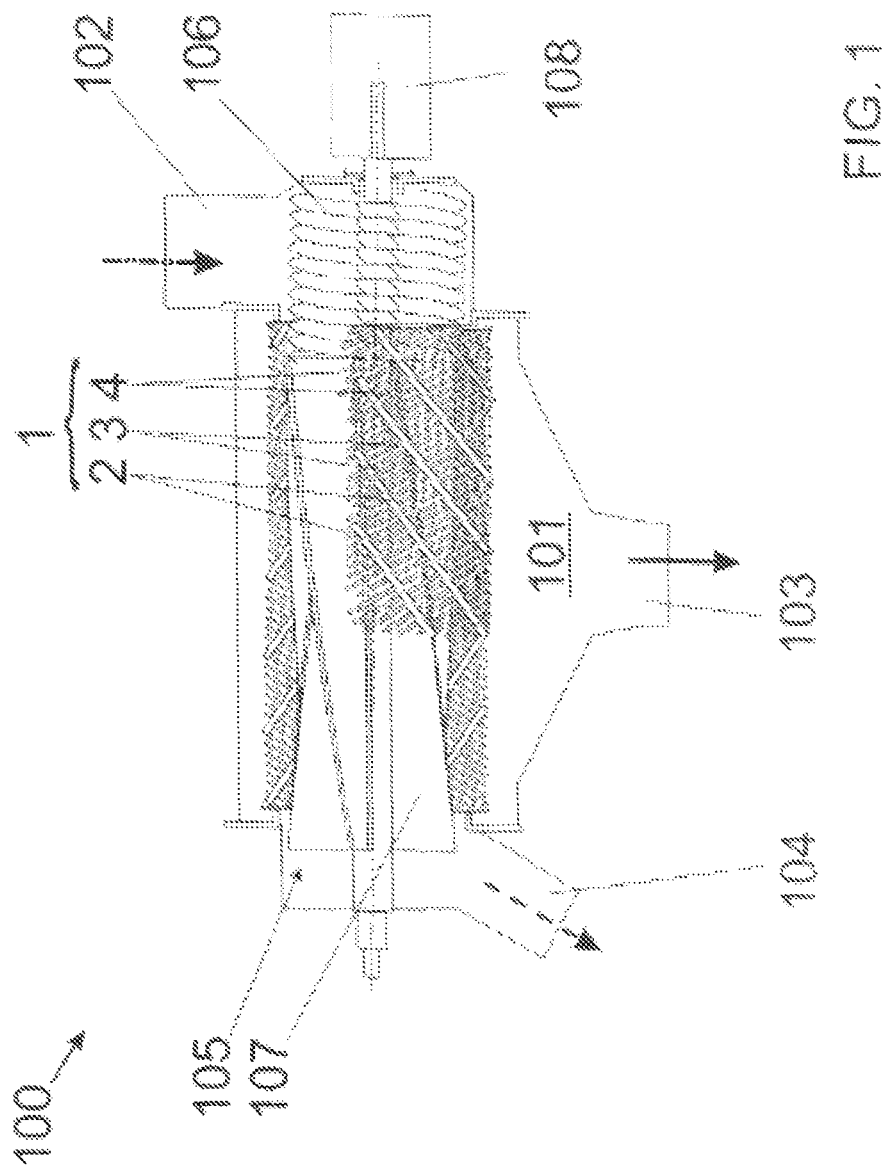
FIG. 1 shows a schematic view of the turbo filter, in which its main components are seen, with the metallic filtration body in its original construction, which is improved in this patent application.
Figure 4:
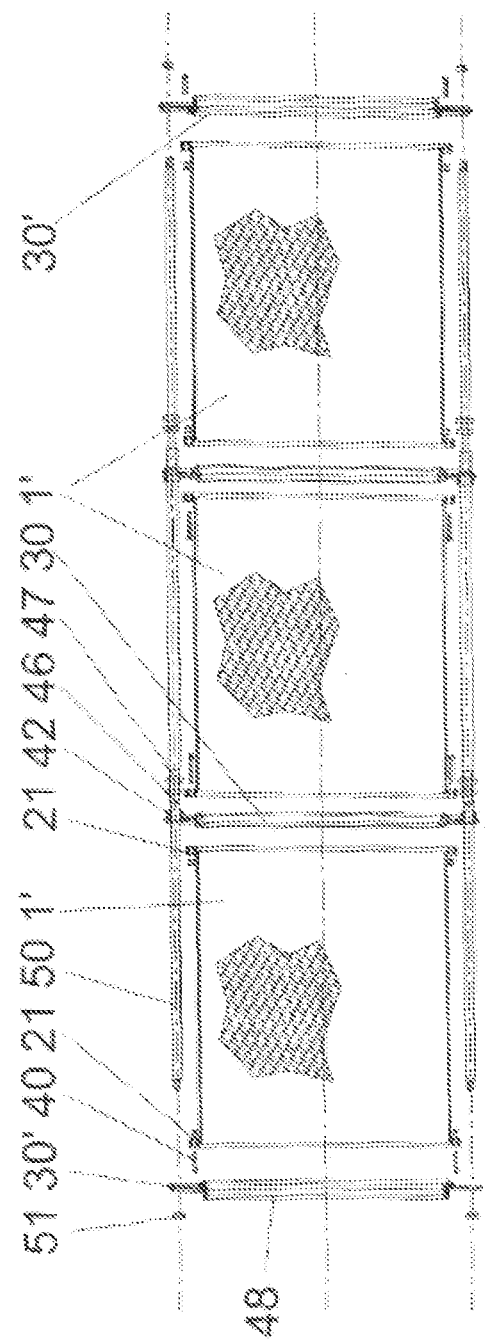
FIG. 4 shows the metallic filtration body in front view.
Figure 5:
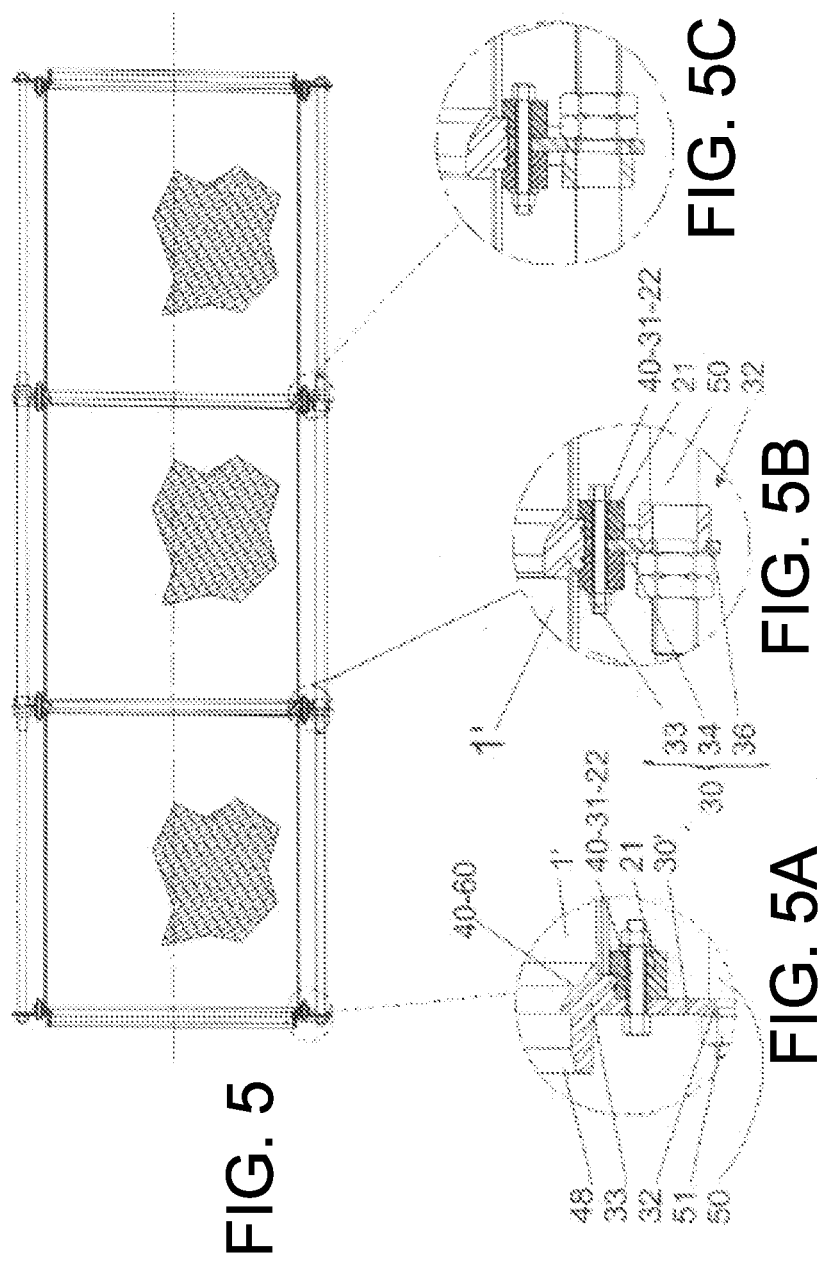

As illustrated by the above figures and foreseen in the invention, the metallic filtration (filtrating) body 1 object of this patent is a part of a turbo filter 100, which essentially comprises (FIG. 1) a filter body provided with an intermediate filtration chamber 101, with extreme inlet 102 for the product to be filtered, a lower filtrate outlet 103 and an opposite extreme outlet 104 for solids; a metallic filtration body 1 laid out inside and along the filtration chamber 101 and communicating with the inlet 102 and outlets 103, 104 of the same; by a rotor 105, having two sets of helical paddles, a set of fine step paddles 106 laid out at the turbo filter body inlet, providing axial impulse and no radial impulse for the product, defining the input stage for the product to be filtrated; and a set of coarse step paddles 107, placed inside and along the filtrating body 1, which gives a great radial impulse and a small axial one, defining the processing stage, in which the product outflows in the form of growing vortex between the inlet and outlet and close to the metallic filtration body's internal face I, providing simultaneously with the filtration in which the angular position among the filtration vents and the product flow determines the least size of the solid particle to be retained and the self-cleaning effect by filtration body washing; by washing and counterwashing devices in the filtration body; by a motor device 108, to drive the rotor and others.

The metallic filtration body 1, in its original form (FIG. 1) is made up by a tubular metallic grid, in a single piece, formed by: a number of thicker metallic reinforcement bars 2, parallel to each other and a number of thinner stems 3, parallel to one another, said bars 2 and stems 3 being crossed and welded to one another and the spaces among the same defining the filtration vents 4.

Figure 6:
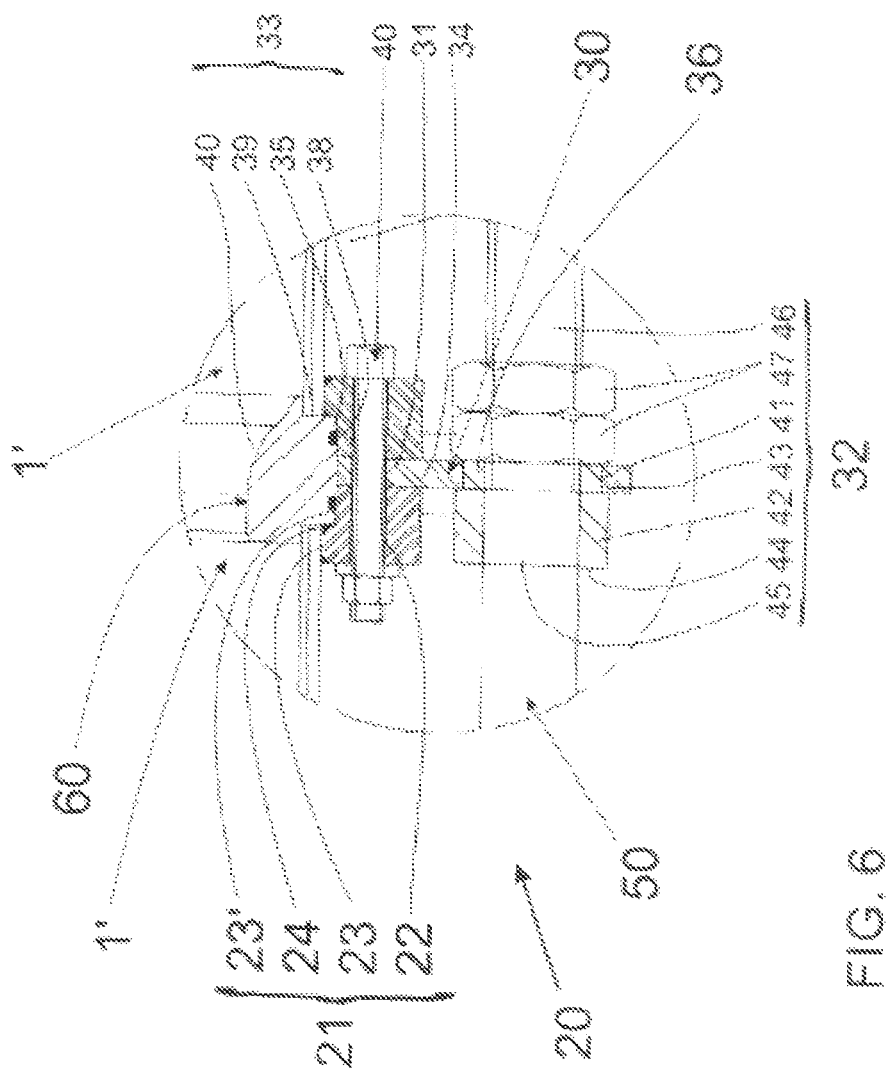
FIG. 6 shows the enlarged detail C in the former figure enlarged and having numeric references indicating the several filtration body construction details.
Figure 7:
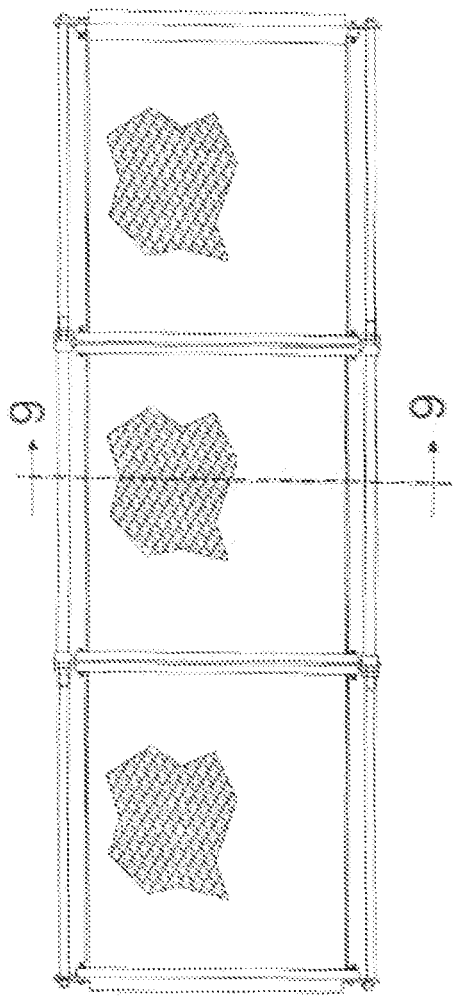
FIGS. 7 and 8 show the metallic filtration body in front view and cross view.

In an initial construction, said tubular metallic filtration body 1 is in a single piece. This improvement consists, in essence, to provide the tubular metallic filtration body 1, essentially comprising (FIGS. 2 to 8) two or more, preferably three, coaxial and adjacent sections of the tubular metallic filtration body 1', by a connection device 20 among the sections of the tubular metallic filtration body 1' and a flow regulating device 60 for the product inside and among the sections of the tubular metallic filtration body 1' (FIG. 6).

Thus, each section of the tubular metallic filtration body 1' is made up (FIG. 2) by a tubular grid formed by: bars 2 and stems 3, crossed and welded to each other, and filtration vents 4, defined among bars 2 and stems 3.

The connection device 20 (FIGS. 2 to 5) comprises essentially: pairs of connection rings 21, welded on the outer surfaces of the ends of respective sections of the tubular metallic filtration body 1'; by intermediate flanges 30, intercalated among said connection rings 21; by extreme flanges 30' provided in the free ends of the sections in the extreme tubular metallic filtration body 1'; by several, preferably six, sets of aligned holes 22 and 31, regularly spaced by the connection rings perimeters 21 and intermediate flanges 30 and extreme flanges 30'; by sets of fastening bolt and nut 40 applied to the aligned holes 22, 31 and which fix sections of the adjacent tubular metallic filtration body 1', having the intermediate flanges 30 intercalated, which fix extreme flanges 30' in the free ends of the extreme tubular metallic filtration body 1'; said fastening device 20 being further formed by several, preferably six, beams 50 for the structuring of the set of sections of tubular metallic filtration body 1', placed at regular spaces around them, crossing peripheral drillings 32 of intermediate flanges 30 and extreme flanges 30', whose free ends have threads, cross drillings 32 and receive the respective fastening and fixation nuts 51.

In detail, each extreme outer ring 21 (FIGS. 5, 5A-5C, 6) placed externally in the respective end of the section in the tubular metallic filtration body 1', is provided with staggered inner surface defined by a higher radially extreme surface 23; by an extreme radially lower surface 23' and a radial intermediate surface 24, which interconnects those ones, with the radially higher extreme surface 23 is welded to the outer surface of the end of the section in the tubular metallic filtration body 1' and the radially lower extreme surface 23' is projected beyond said end and constitutes an extreme stop 23' and said extreme outer ring 21 further presents passing holes 22, placed parallel to the axial direction of the filtrating set.

Each intermediate flange 30 and extreme flanged 30' is formed, from the center to periphery (FIG. 3) by a central annular section 33~by an intermediate annular band 34, which extends radially from its outer surface center 35 and provided with holes 31; and a staggered peripheral band formed by radial sections 36, with drillings 32 and intercalated by curved indentations 37.

The central annular section 33 (FIGS. 5, 5A-5C, and 6) has an outer surface 35, which has opposite regions supported on respective extreme stops 23' of connection rings 21 of the sections in the adjacent tubular metallic filtration body 1'; said opposite regions being provided with the respective receptor furrows of the sealing rings 38, which seal against said extreme stops 23'. Said central annular section 33 has opposite front surfaces, each of them being defined by indentation 39, provided with radial surface that makes an edge with the outer surface 35 and the axial surface, and in which there is a close fit of the end of the section in the tubular metallic filtration body 1', which has welded the radially higher extreme surface 23 of the connection ring 21. Said central ring section 33 is further defined by an inner surface 40, which is projected inside the sections of the adjacent tubular metallic filtration body 1' and provided with a profile that defines the regulation device 60 of the product flow inside and among said sections of the adjacent tubular metallic filtration body 1'. Said internal surface 40, which defines the flow regulation device 60 for the product within the sections of the tubular metallic filtration body 1' can feature different profiles, selected according to the product to be filtrated and with the hydrodynamic features desired for its flow.

Each peripheral drilling 32 (FIG. 6) of an intermediate flange 30 or extreme flange 30' is aligned to equal drillings in the other intermediate flanges 30 or extreme flanges 30'. Each drilling 32 is constituted by: a drilling 41 made in the flange 30, 30'; a sleeve 42 crossed by beam 50, provided with lowered extreme outer band 43, which is inside the drilling 41 and limited by radial surface that is against the flange 30, 30' surface, around the drilling 41; said sleeve 42 has an edge 44 opposite to the edge adjacent to the lowered band 4, which is placed against a step-stop 45, foreseen around the beam 50; section of the flange 30, 30'hs a thread 46, which receives to fastening nuts 47 that are pressed against the flange 30, 30' band around the drilling 41.

Each extreme flange 30'(FIGS. 2, 3, 5A) is substantially equal to the intermediate flanges 30 and presents as difference in respect to it the fact that its central annular section 33 is provided with internal surface 40 turned to inside the section of the tubular metallic filtrating body 1' and constitutes the flow regulation of the product and opposite to said inner surface 40 a tubular nozzle 48 is extended, for coupling in a product inlet surface or the outlet of solids from the turbo filter. The intermediate annular band 34 of said extreme flange 30' extends radially from the outer surface 35 of the central annular section 33 and is provided with drillings 31. The notched peripheral band of said extreme flange 30' is formed by radial sections 36, provided with drillings 32 and intercalated by curved indentations 37.

Figure 8:
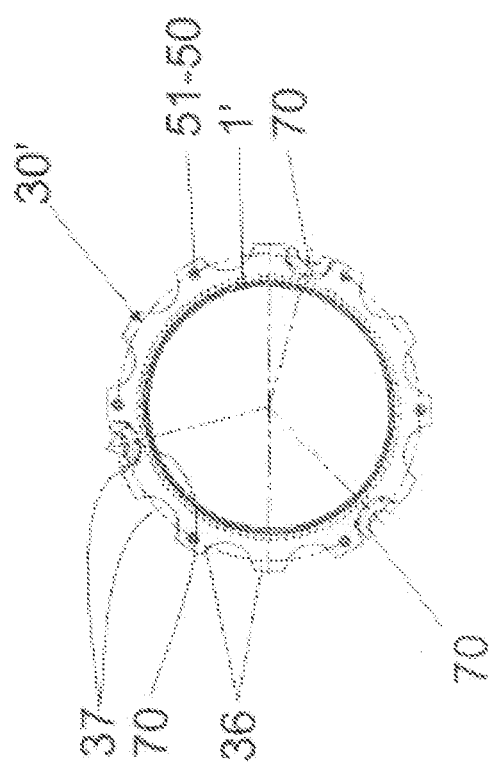

At least three indentations 37, equidistant from the flanges 30, 30' are supported on seatings 70 (FIG. 8).

All the sections of the tubular metallic filtrating body 1' can have filtrating vents 4, equal to or, optionally, said sections of the tubular metallic filtrating body 1' can have filtration drillings 4 with different vents in respect to one another, so as to better control the filtration process, according to the product to be filtrated.

The metallic filtrating body, formed by sections of the tubular metallic filtration body 1', axially aligned and connected by the connection device 20, as described above and object of this patent, provides all the filtration effects provided by the filtration body in a single piece, under the certified application for addition to invention CI 0700933-0, referred to above, with the extra advantage of better supporting the demands by the filtration process, facilitating eventual repairs, plus the function of acting on the flow of product obtained by the flow regulating device 60 inside the sections of the tubular metallic filtration body 1'; the function of a better adjustment to the intended filtration process, provided by the possibility of sections of the tubular metallic filtrating body 1' to have filtration drillings equal to or different from each other.

Within the basic construction referred to above, the metallic filtration body object of this patent can feature modifications in respect to materials, dimensions, construction details and/or functional and/or ornamental configuration, without deviating from the demanded protection aspect.

With the foregoing, instead of each section in the tubular metallic filtration body 1' being constituted by a tubular grid formed by bars 2 and stems 3 crossed and welded to each other, as described above, said sections of the tubular metallic filtration body 1' can be made up by a perforated plate (not illustrated), with drillings of whatever sizes and formats, according to the intended effects.

What is claimed is:

1. A tubular metallic filtration body configured for incorporation into a turbo filter (100), wherein the tubular metallic filtration body comprises:
   a tubular metallic grid constructed as a single piece and formed by: metallic reinforcement bars (2) that are disposed parallel to each other, and parallel stems (3), the bars (2) being thicker than the stems (3), said bars (2) and stems (3) being crossed and welded to one another so as to form spaces that define filtration vents (4);
   wherein the tubular metallic filtration body is comprised of two or more coaxial sections, each coaxial section being attached to adjacent coaxial sections via a connection device (20), the connection device (20) comprising:
   a pair of connection rings (21), each ring (21) having a staggered inner surface defined by an upper surface (23), a lower surface (23'), and an intermediate surface (24) interconnecting the upper and lower surfaces, wherein the lower surface (23') is projected beyond the tubular metallic filtration body; and
   a center annular section (33) having an outer surface (35), and an internal surface (40) defining a flow regulating device (60) for the product inside the sections of the tubular metallic filtration body (1).

2. The tubular metallic filtration body according to claim 1, wherein each connection ring (21) further comprises passing drillings laid out parallel to the axial direction of the filtration body.

3. The tubular metallic filtration body according to claim 1, wherein all the sections in the tubular metallic filtration body comprise the filtration vents (4), the vents (4) being equal to one another.

4. A tubular metallic filtration body configured for incorporation into a turbo filter (100), wherein the tubular metallic filtration body comprises:
   a tubular metallic grid constructed as a single piece and formed by: metallic reinforcement bars (2) that are disposed parallel to each other, and parallel stems (3), the bars (2) being thicker than the stems (3), said bars (2) and stems (3) being crossed and welded to one another so as to form spaces that define filtration vents (4);
   wherein the tubular metallic filtration body is comprised of two or more coaxial sections, each coaxial section being attached to adjacent coaxial sections via a connection device (20), the connection device (20) comprising:
  a pair of connection rings (21), each ring (21) having a staggered inner surface defined by an upper surface (23), a lower surface (23'), and an intermediate surface (24) interconnecting the upper and lower surfaces, and
  a center annular section (33) having an outer surface (35), and an internal surface (40) defining a flow regulating device (60) for the product inside the sections of the tubular metallic filtration body (1), the outer surface (35) being supported on the connection rings (21); and
  wherein the connection rings (21) are welded to outer surfaces of adjacent ends of adjacent sections of the tubular metallic filtration body via intermediate flanges (30) intercalated between said connection rings (21).

5. The tubular metallic filtration body of claim 4, further comprising:
  a distal connection device disposed at each free end of the tubular metallic filtration body, each distal connection device having a distal connection ring welded to the outer surface of the respective free ends of the tubular metallic filtration body via an extreme flange (30)' disposed at the respective free ends of the tubular metallic filtration body (1); and
  wherein each of the connection rings and distal connection rings further comprise:
    sets of aligned drillings (22) and (31), regularly spaced around the perimeters of the connection ring and distal connection rings, and the intermediate flanges (30) and extreme flanges (30)', respectively, and corresponding sets of fastening bolts and nuts (40) and configured to match the respective drillings (22), (31) and affix the sections of the adjacent tubular metallic filtration body (1)', having intermediate flanges (30) intercalated and which fix extreme flanges (30)' at the free ends of the sections in the extreme tubular metallic filtration body (1)', and wherein
  each connection device and distal connection device is configured to attach to one or more beams (50) via a crossing peripheral drilling (32) of the intermediate (30) and extreme (30)' flanges, wherein the free ends of the flanges (30) and (30)' comprise threads configured to receive fastening and fixation nuts (51) for affixing the beams to the connection device and distal connection device, respectively.

6. The tubular metallic filtration body according to claim 5, wherein each intermediate (30) and extreme (30)' flange is defined, from the center to periphery, by the central annular section (33), an intermediate annular band (34) extending radially from the outer surface (35) and provided with drillings (31), and a notched peripheral band formed by radial sections (36) provided with drillings (32) and intercalated by curved indentations (37).

7. The tubular metallic filtration body according to claim 6, wherein the outer surface (35) of each central annual section (33) is supported on the respective lower surfaces (23)' of the connection rings (21) and wherein each outer surface (35) comprises respective receiving sealing rings furrows (38) which seal against the respective lower surfaces (23)', and the central annular section (33) having opposite front surfaces, each of them being defined by an indentation in which the end of each section of the tubular metallic filtration body fits, said central annular section (33) being further defined by the internal surface (40) that is projected inside the sections of the adjacent tubular metallic filtration body.

8. The tubular metallic filtration body according to claim 5, wherein each peripheral drilling (32) of an intermediate flange (30) or extreme flange (30)' is aligned to equal drillings in the other intermediate (30) and extreme (30)' flanges and is constituted by a wherein each peripheral drilling (32) comprises:
  a drilling (41) made in flange (30), (30)';
  a sleeve (42) crossed by beam (50), with an end being assembled inside the drilling (41) and the opposite one being provided with an edge (44), that is against a step stop (45), which is positioned around the beam (50); and a section of this latter being next adjacent to flange (30), (30)' having
  a thread (46) positioned adjacent to the flange (30), (30)', and configured to receive two fastening nuts (47) that are pressed against the flange (30), (30)' band around the drilling (41).

9. The tubular metallic filtration body according to claim 5, wherein the central annular section (33) coupled to the extreme flange (30)' comprises:
  an inner surface (40) turned to inside the section of the tubular metallic filtration body that constitutes a flow regulation device (60) for the product; and
  a coupling tubular nozzle (48) opposite the inner surface (40) extending in a product inlet surface or the outlet of solids from the turbo filter.

10. A filtration system, comprising:
  a turbo filter (100), comprising,
    an intermediate filtration chamber (101) having a product inlet (102), a filtrate outlet (103), and an outlet of solids (104),
    a rotor (105) provided with a set of fine step (106) positioned adjacent to the product inlet (102) and a set of coarse step paddles (107) positioned adjacent to the outlet of solids (104), and
    a motor device (108) configured to activate the rotor (105); and
  a tubular filtration body (1) incorporated into the a turbo filter (100), the tubular filtration body comprising,
    a tubular metallic grid formed by metallic reinforcement bars (2) that are disposed parallel to each other, and parallel stems (3), the bars (2) being thicker than the stems (3), said bars (2) and stems (3) being crossed and welded to one another so as to form filtration vents (4);
    two or more coaxial sections, each coaxial section being attached to adjacent coaxial sections via a connection device (20), the connection device (20) comprising:
      a pair of connection rings (21), each ring (21) having a staggered inner surface defined by an upper surface (23), a lower surface (23'), and an intermediate surface (24) interconnecting the upper and lower surfaces, wherein the lower surface (23') is projected beyond the tubular metallic filtration body, and wherein each connection ring (21) further comprises passing drillings laid out parallel to the axial direction of the filtration body, and
      a center annular section (33) having an outer surface (35), and an internal surface (40) defining a flow regulating device (60) for the product inside the sections of the tubular metallic filtration body (1), the outer surface (35) being supported on the connection rings (21).

\* \* \* \* \*